(12) United States Patent
Forgang et al.

(10) Patent No.: US 7,759,940 B2
(45) Date of Patent: Jul. 20, 2010

(54) MUTUAL SHIELDING OF COLLOCATED INDUCTION COILS IN MULTI-COMPONENT INDUCTION LOGGING INSTRUMENTS

(75) Inventors: Stanislav W. Forgang, Houston, TX (US); Randy Gold, Houston, TX (US); Luis M. Pelegri, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 105 days.

(21) Appl. No.: 11/696,583

(22) Filed: Apr. 4, 2007

(65) Prior Publication Data

US 2008/0246486 A1   Oct. 9, 2008

(51) Int. Cl.
*G01V 3/38* (2006.01)
*G01V 3/10* (2006.01)

(52) U.S. Cl. .................................. 324/334; 324/338
(58) Field of Classification Search ................. 324/326, 324/329, 333, 334, 337, 338, 339, 343, 344
See application file for complete search history.

(56) References Cited

U.S. PATENT DOCUMENTS

| | | | |
|---|---|---|---|
| 4,264,862 A | 4/1981 | Koelle et al. | |
| 4,302,722 A | 11/1981 | Gianzero | |
| 4,302,723 A * | 11/1981 | Moran | 324/343 |
| 4,360,777 A | 11/1982 | Segesman | |
| 4,808,929 A * | 2/1989 | Oldigs | 324/339 |
| 4,837,517 A | 6/1989 | Barber | 324/339 |
| 5,157,605 A | 10/1992 | Chandler et al. | 364/422 |
| 5,438,267 A | 8/1995 | Wu | |
| 5,452,761 A | 9/1995 | Beard et al. | 166/250 |
| 5,600,246 A | 2/1997 | Forgang et al. | 324/339 |
| 5,781,436 A | 7/1998 | Forgang et al. | 364/422 |
| 5,999,883 A | 12/1999 | Gupta et al. | 702/7 |
| 6,181,138 B1 * | 1/2001 | Hagiwara et al. | 324/338 |
| 6,566,881 B2 | 5/2003 | Omeragic et al. | |
| 6,586,939 B1 | 7/2003 | Fanini et al. | |
| 6,630,830 B2 | 10/2003 | Omeragic et al. | 324/338 |
| 6,667,620 B2 | 12/2003 | Homan et al. | |
| 6,690,170 B2 | 2/2004 | Homan et al. | 324/339 |
| 6,734,675 B2 | 5/2004 | Fanini et al. | |
| 6,930,652 B2 | 8/2005 | Smith et al. | 343/895 |
| 7,038,457 B2 * | 5/2006 | Chen et al. | 324/339 |
| 7,286,091 B2 | 10/2007 | Chen et al. | 343/719 |
| 2003/0028324 A1 | 2/2003 | Xiao et al. | 702/7 |
| 2003/0030439 A1 | 2/2003 | Gao et al. | 324/339 |
| 2003/0090269 A1 | 5/2003 | Fanini et al. | |
| 2003/0100994 A1 | 5/2003 | Strickland et al. | 702/7 |

(Continued)

FOREIGN PATENT DOCUMENTS

WO    WO98/00733    1/1998

OTHER PUBLICATIONS

L. A. Tabarovskii et al.; *Geometric and Frequency Focusing in Exploration of Anisotropic Seams*, Nauka, USSR Academy of Science, Siberian Division, Novosibirsk, pp. 67-129 (1972).

(Continued)

*Primary Examiner*—Kenneth J Whittington
(74) *Attorney, Agent, or Firm*—Mossman Kumar & Tyler PC

(57) ABSTRACT

In a multicomponent logging tool, a coil is electrically isolated by open circuiting another, substantially orthogonal coil.

20 Claims, 5 Drawing Sheets

U.S. PATENT DOCUMENTS

| | | |
|---|---|---|
| 2003/0107378 A1 | 6/2003 | Strickland et al. ........... 324/339 |
| 2003/0114987 A1 | 6/2003 | Edwards et al. ................ 702/7 |
| 2004/0046560 A1 | 3/2004 | Itskovich et al. ............ 324/339 |
| 2004/0100263 A1 | 5/2004 | Fanini et al. ................ 324/339 |
| 2005/0083061 A1 | 4/2005 | Tabanou et al. |
| 2005/0253589 A1 | 11/2005 | Fabris et al. ................ 324/367 |
| 2006/0125479 A1 | 6/2006 | Chemali et al. ............. 324/339 |
| 2006/0192561 A1 | 8/2006 | Chesser et al. .............. 324/339 |
| 2006/0192562 A1 | 8/2006 | Davydychev et al. ....... 324/339 |
| 2006/0208737 A1 | 9/2006 | Merchant et al. ............ 324/330 |
| 2006/0214664 A1 | 9/2006 | Folberth et al. ............. 324/339 |
| 2007/0170923 A1 | 7/2007 | Forgang et al. ............. 324/339 |
| 2007/0205770 A1 | 9/2007 | Fanini et al. ................ 324/339 |

OTHER PUBLICATIONS

J.H. Moran et al.; *Basic Theory of Induction logging and Application to Study of Two-Coil Sondes*, Geophysics, vol. 27, No. 6, Part 1, Dec. 1962, pp. 829-858.

L. A. Tabarovskii et al.; *Radial Characteristics of Induction Focusing Probes with Transverse Detectors in an Anisotropic Medium*, Soviet Geology and Geophysics, vol. 20, 1979, pp. 81-90.

* cited by examiner

MUTUAL SHIELDING OF COLLOCATED INDUCTION COILS IN MULTI-COMPONENT INDUCTION LOGGING INSTRUMENTS

BACKGROUND OF THE INVENTION

1. Field of the Invention

The invention is related generally to the field of electromagnetic induction resistivity well logging instruments wherein the induction antennas are oriented transversely with respect to the longitudinal axis of the instrument. More specifically, the invention is related to an apparatus for transverse electromagnetic induction resistivity well logging operating in the frequency and/or time domain with reduced errors introduced into the acquired logging data.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, Basic Theory of Induction Logging and Application to Study of of Two-Coil Sondes, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 issued to Barber, in U.S. Pat. No. 5,157,605 issued to Chandler et al and in U.S. Pat. No. 5,600,246 issued to Fanini et al.

The conventional geophysical induction resistivity well logging tool is a probe suitable for lowering into the borehole and it comprises a sensor section containing a transmitter and receiver and other, primarily electrical, equipment for measuring data to infer the physical parameters that characterize the formation. The sensor section, or mandrel, comprises induction transmitters and receivers positioned along the instrument axis, arranged in the order according to particular instrument or tool specifications and oriented parallel with the borehole axis. The electrical equipment generates an electrical voltage to be further applied to a transmitter induction coil, conditions signals coming from receiver induction coils, processes the acquired information, stores or by means of telemetry sending the data to the earth surface through a wire line cable used to lower the tool into the borehole.

Conventional induction well logging techniques employ coils wound on an insulating mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In conventional induction logging apparatus, the basic transmitter coil and receiver coil has axes which are aligned with the longitudinal axis of the well logging device. (For simplicity of explanation, it will be assumed that the borehole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the bore hole, and the vertical resistivity in the direction parallel to the bore hole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722.

Thus, in a vertical borehole, in a clastic sedimentary sequence, a conventional induction logging tool with transmitters and receivers (induction coils) oriented only along the borehole axis responds to the average horizontal conductivity that combines the conductivity of both sands and shales. These average readings are usually dominated by the relatively higher conductivity of the shale layers and exhibit reduced sensitivity to the lower conductivity sand layers where hydrocarbon reserves are produced. To address this problem, loggers have turned to using transverse induction logging tools having magnetic transmitters and receivers (induction coils) oriented transversely with respect to the tool longitudinal axis. Such instruments for transverse induction well logging has been described in PCT Patent publication WO 98/00733 of Beard et al. and U.S. Pat. No. 5,452,761 to Beard et al.; U.S. Pat. No. 5,999,883 to Gupta et al.; and U.S. Pat. No. 5,781,436 to Forgang et al.

One difficulty in interpreting the data acquired by a transversal induction logging tool is associated with vulnerability of its response to borehole conditions. Among these conditions is the presence of a conductive well fluid as well as wellbore fluid invasion effects. A known method for reducing these unwanted impacts on the transversal induction logging tool response was disclosed in L. A. Tabarovsky and M. I. Epov, Geometric and Frequency Focusing in Exploration of Anisotropic Seams, Nauka, USSR Academy of Science, Siberian Division, Novosibirsk, pp. 67-129 (1972) and L. A. Tabarovsky and M. I. Epov, Radial Characteristics Of Induction Focusing Probes With Transverse Detectors In An Anisotropic Medium, Soviet Geology And Geophysics, 20 (1979), pp. 81-90.

There are a few hardware margins and software limitations that impact a conventional transversal induction logging tool performance and result in errors appearing in the acquired data. The general hardware problem is typically associated with an unavoidable electrical field that is irradiated by the tool induction transmitter simultaneously with the desirable magnetic field, and it happens in agreement with Maxwell's equations for the time varying field. The transmitter electrical field interacts with remaining modules of the induction logging tool and with the formation; however, this interaction does not produce any useful information. Indeed, due to the always-existing possibility for this field to be coupled directly into the receiver part of the sensor section through parasitic displacement currents, it introduces the noise. When this coupling occurs, the electrical field develops undesirable electrical potentials at the input of the receiver signal conditioning, primarily across the induction coil receiver, and this voltage becomes an additive noise component to the signal of interest introducing a systematic error to the measurements.

The problem could become even more severe if the induction logging tool operates in wells containing water-based fluids. The water-based mud has a significantly higher electrical permittivity compared to the air or to the oil-based fluid. In the same time, the electrical impedance to the above mentioned displacement currents can be always considered as capacitive coupling between the source—the induction transmitter and the point of coupling. This circumstance apparently would result in a fact that capacitive capacitive coupling and associated systematic errors are environment dependant because capacitive impedance will be converse to the well mud permittivity.

The conventional method in reducing this capacitive coupling in the induction logging instrument lays in using special electrical (Faraday) shields wrapped around both transmitter and receiver induction coils. These shields are electrically attached to the transmitter analog ground common point to fix their own electrical potential and to provide returns of the displacement currents back to their source—transmitter instead of coupling to any other place in the tool. However, geometry and layout effectiveness of Faraday shields becomes marginal and contradictory in the high frequency applications where conventional transverse induction tools can operate. These limitations occur due to the attenuation these shields introduce to the magnetic field known in the art as a shield "skin effect". The shield design limitations are unavoidable and, therefore, the possibility for the coupling through displacement currents remains.

Examples of the use of Faraday shields are disclosed in U.S. Pat. No. 6,630,830 to Omeragic et all, and in U.S. Pat. No. 6,667,620 to Homan et al. A problem with such prior art devices is the fact that the different coils for both the transmitter and the receiver are in spatially different positions. As a result of this, the different magnetic field components sample different portions of the earth and may also have different transmitter-receiver distances. A second problem with a device such as that in Omeragic (which uses tilted antennas) is the use of a non-conducting slotted shield in which the slots are designed to be orthogonal to the plane of the coil around the full 360° of the tool. In addition, the Faraday shield that is disposed that is disposed on the non-conducting shield has a complex geometry. One or more of these problems is avoided in the present invention.

SUMMARY OF THE INVENTION

One embodiment of the invention is an apparatus for evaluating an earth formation. The apparatus includes a logging tool conveyed in a borehole. The apparatus includes a logging tool configured to be conveyed in a borehole in the earth formation. A logging tool includes a first coil defining a first dipole magnetic antenna and a second coil defining a second dipole magnetic antenna substantially orthogonal to the first dipole magnetic antenna. The apparatus also includes circuitry configured to switch the second coil between an open circuit mode and an active mode. The first and second coils may be transmitter antennas. The apparatus may further include third and fourth coils comprising receiver antennas. The apparatus may also include a third coil defining a third dipole magnetic antenna substantially orthogonal to the first dipole magnetic antenna and the second dipole magnetic antenna. When the first coil is in an active mode and a second coil is in an open circuit mode, the apparatus may further include a receiver coil configured to produce a signal indicative of a profit the of the earth formation resulting from activation of the first coil, and a processor configured to determine the property of the earth formation using the signal. The property of the earth formation may be a horizontal resistivity, a vertical resistivity, an inclination angle and/or a distance to a bed boundary in the earth formation. The apparatus may further include a conveyance devise configured to convey the logging tool into the borehole; the conveyance devise may be a wireline, a drilling wireline, a drilling tubular, or its slickline. A thickness of the first coil and/or the second coil may be less than a skin depth of an electromagnetic wave and an operating frequency of the logging tool. A pitch of the first coil and/or the second coil may be selected to reduce an attenuation of the magnetic field produced by the first coil and a second coil.

Another embodiment of the invention is a method of evaluating an earth formation. A logging tool is conveyed in a borehole in the earth formation. A first coil on the logging tool is activated wider using a second coil on the logging tool for electrically isolating an electric field resulting from activation of the first coil. A signal indicative of a property of the earth formation is produced by the activation. The property of the earth formation is estimated from the signal. The electrical isolation may be done by open-circuiting the second coil. The first coil and the second coil may be substantially orthogonal to each other and half substantially the same center. The method may further include activating the second coil, producing an additional signal indicative of the property of the earth formation resulting from the activation of the second coil, and using the additional signal for estimating the property. The method may further include using a third coil to further isolate the electric field. The property of the earth formation may be a horizontal resistivity, a vertical resistivity, an inclination angle and/or a distance to a bed boundary in the earth formation. The method may further include conveying the logging tool into the borehole using a wireline, a drilling tubular, or a slickline.

Another embodiment of the invention is an apparatus for evaluating an earth formation. The apparatus includes a logging tool configured to be conveyed in a borehole. A first transmitter coil on the logging tool defines a first dipole magnetic antenna the first antenna the first transmitter coil configured to operate at a first frequency. A second transmitter coil on the logging tool defines a second dipole magnetic antenna substantially orthogonal to the first dipole magnetic antenna. The second transmitter coil is configured to operate at a second frequency different from the first frequency. A receiver coil on the logging tool is configured to produce an output indicative of a profit the of the earth formation upon activation of at least one of the transmitter coils. The first transmitter coil and a second transmitter coil may be coupled to a current source having a high output impedance. The receiver coil may be coupled to an amplifier having a high input impedance. The apparatus may further include a conveyance device selected from a wireline, coiled tubing or a drilling tubular.

Another embodiment of the invention is a method of evaluating an earth formation. A logging tool is conveyed into a borehole in the earth formation. A first transmitter coil on the logging tool which defines a first dipole magnetic antenna is activated at a first frequency. A second transmitter coil on the logging tool which defines a second dipole magnetic antenna substantially orthogonal to the first dipole magnetic antenna is activated at a second frequency different from the first frequency. A receiver coil is used to produce an output indicative of the property of the earth formation upon activation of at least one of the transmitter coils.

BRIEF DESCRIPTION OF THE DRAWINGS

The invention is best understood by reference to the accompanying figures wherein like numbers refer to like components and in which.

DETAILED DESCRIPTION OF THE INVENTION

Figure 1:
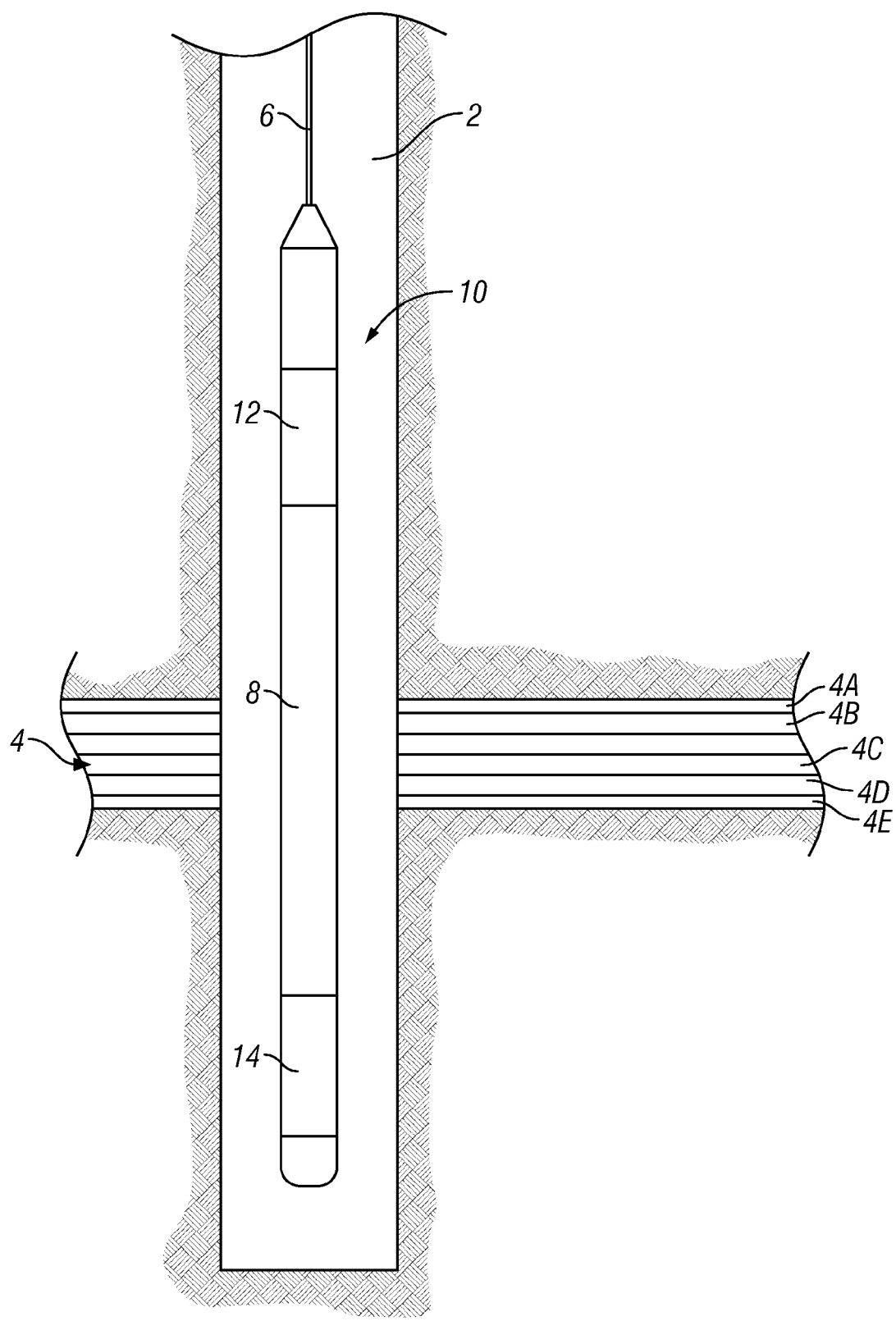
FIG. 1 shows an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
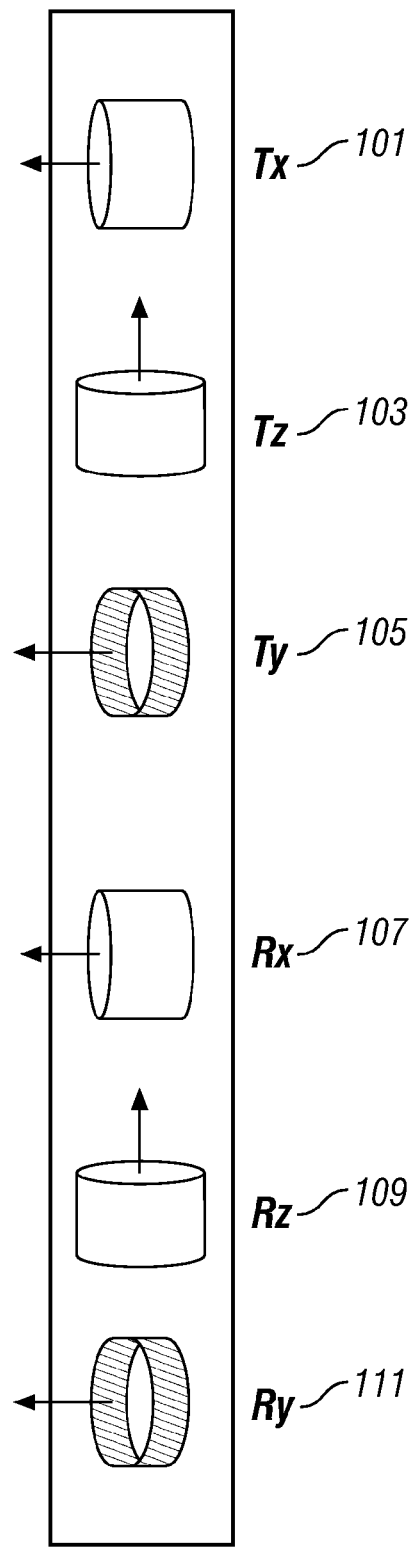
FIG. 2 (Prior Art) shows the arrangement of transmitter and receiver coils in the multicomponent induction logging tool marketed under the name 3DEX™.

Referring to FIG. 2, the configuration of transmitter and receiver coils in the 3DExplorer™ induction logging instrument of Baker Hughes is shown. Three orthogonal transmitters 101, 103 and 105 that are referred to as the $T_x$, $T_z$, and $T_y$ transmitters are transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$ and $H_{xz}$ components are measured, though other components may also be used.

Figure 3A:
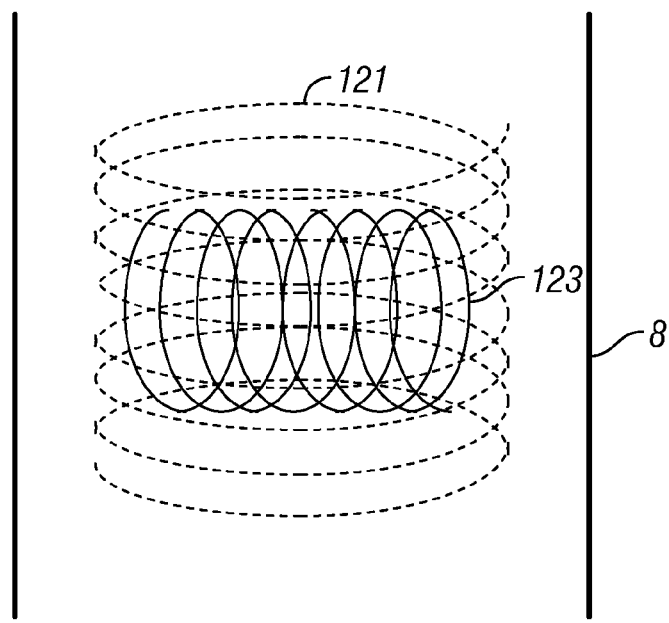
FIG. 3a shows an arrangement in which the vertical component coil shields a transverse coil.

The basic principles of the present invention are illustrated with reference to FIGS. 3a, 3b and FIGS. 4a-4b. Shown in FIG. 3a is a mandrel with a z-coil 121 and a transverse coil 123. The transverse coil could be the z-coil or the y-coil of a multicomponent logging tool. The discussion herein is equally valid whether the coils are transmitter coils or receiver coils. For the case where the coils are transmitters, when the x-coil is activated, it will act like a transverse magnetic dipole with a magnetic flux transverse to the tool axis.

In the figure, it can be seen that the z-coil completely surrounds the x-coil. It can also be seen that the conductors of the z-coil winding are substantially parallel to the magnetic flux vector produced by the x-coil. Thus, if the coil 121 is open-circuited, it can act as a Faraday shield that would decouple the electric field of the x-transmitter from receivers in the tool (not shown). To further act as a shield one side of the z-coil should be attached to the "common" electrode of the electronics attached to x-coil. This arrangement allows the displacement current appearing due to induced X-component electrical field to complete the current loop and return to their origin source. As can be seen, the arrangement shown in FIG. 3a has the z- and the x-transmitter coils at substantially the same spatial position. In one embodiment of the invention, a y-coil (not shown to simplify shown to simplify the illustration) is also used to provide the ability to generate magnetic fields in three directions.

The shielding of the electric field by a collocated coil is also effective if the coil that is open-circuited is inside the coil that is activated. This intuitively follows from Maxwell's equation $$\nabla \times E = -\frac{\partial B}{\partial t} \quad (1)$$

Figure 3B:
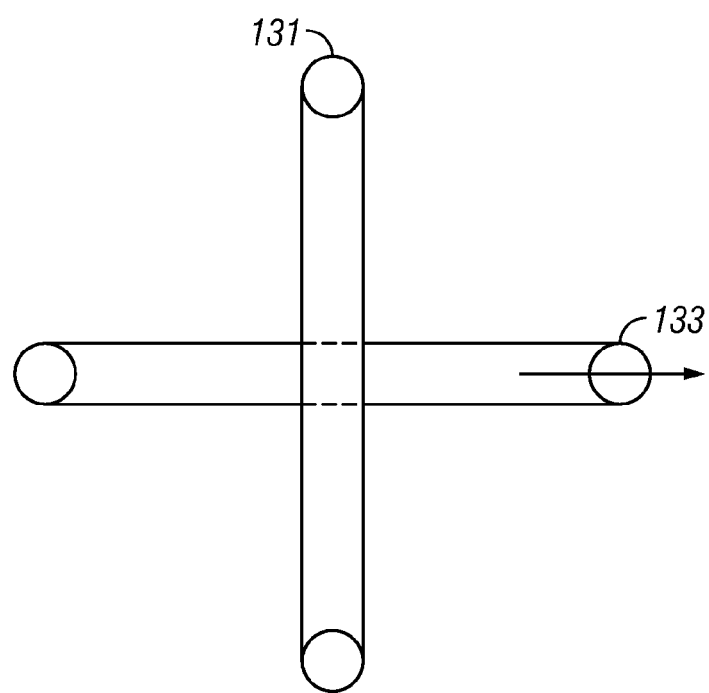
FIG. 3b shows the relation between the conductors of the vertical coil slectrically shield the transverse coil.

We may consider the conductors parallel to the magnetic field as providing a boundary conduction where the electric field is zero. In such a case, it makes little difference if the electric field is forced to zero on a surface inside a coil or outside a coil. This is schematically illustrated in FIG. 3b where the arrow 133 shows the direction of the magnetic field resulting from flow of current through coil 133 (only one turn of the coil is shown). The conductor of coil 133 is substantially parallel to the magnetic field, and thus acts as a Faraday shield when the coil 133 is open-circuited.

Figure 4A:
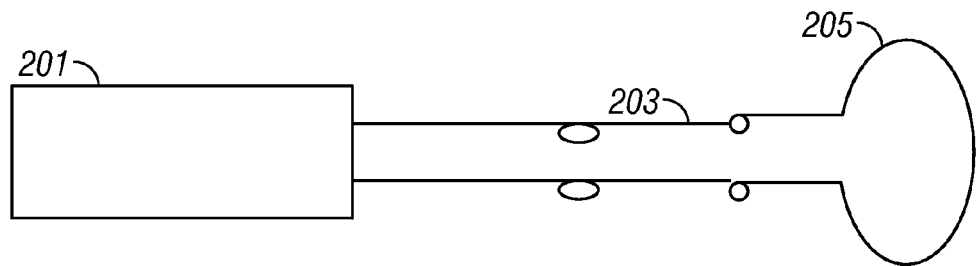
FIGS. 4a and 4b illustrates a switching arrangement in which any of the coils can be switched between active, and open modes.
Figure 4B:
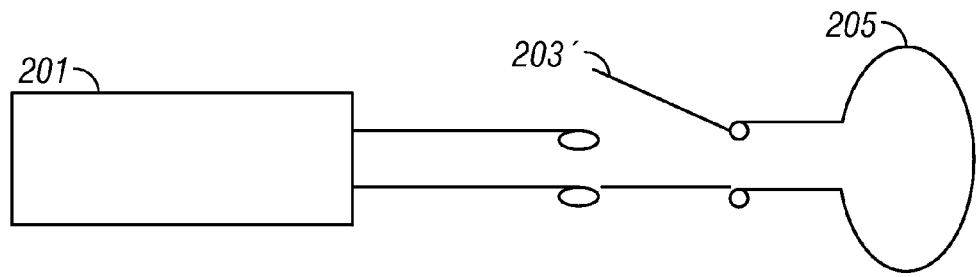

Turning now to FIGS. 4a-4b, a switching arrangement used with the present invention is discussed. Depicted in FIG. 4a is a transmitter (or receiver) coil 205 connected to the transmitter (or receiver) electronics 201 through a switching arrangement 203. In the situation shown in FIG. 4a, the coil may be said to be active.

In the switch position 203' shown in FIG. 4b, the coil is open circuited and can thus act as a Faraday shield as discussed above to any of the other coils of the logging tool.

To summarize, each of the three transmitter coils may be active or open. It is possible to have more than one coil active at the same time provided they are being operated at different frequencies This is equally true of the receiver coils. Multi-frequency operation is feasible if the transmitter coils are energized by current sources, i.e. devices with high output impedance.

It should also be noted that if the transmitter is activated by a current source, the receiver is coupled to a high impedance amplifier, and one side of the corresponding antenna coils and electronics are at the common instrument reference, then the need for the switching arrangement disappears.

The switching between the different modes may be accomplished by suitable electronic circuitry. Such circuitry is known in the art and is not discussed further. For the purposes of the present invention, the term "circuitry" is intended to include a processor or other digital computer.

Those versed in the art and having benefit of the present disclosure would recognize that the spacing between the fingers in a Faraday shield should be sufficiently large and the thickness of the fingers sufficiently small to reduce attenuation of the useful magnetic field. The attenuation could occur due to physical coverage of the magnetic field and to eddy currents induced in the fingers. To minimize the effect of eddy currents, the thickness of the fingers should be much less than the conductor skin depth in the frequency range of interest. The same considerations apply with the design of mutually orthogonal coils with regard to their winding geometry, thickness and pitch.

Those versed in the art and having benefit of the present disclosure would also recognize that Faraday shields operate properly only if there is a path for capacitively induced charges to be removed as pointed out above. If there is no such charge removal, the shield merely changes the self-capacitance of the coil. In one embodiment of the present invention, the return path is provided using a feed-through pipe. As discussed in Fanini, a feed-through pipe provides a connection between housings that contain the transmitter and the receiver electronic modules. The feed-through pipe carries conductors between the two housings containing these modules.

Figure 5:
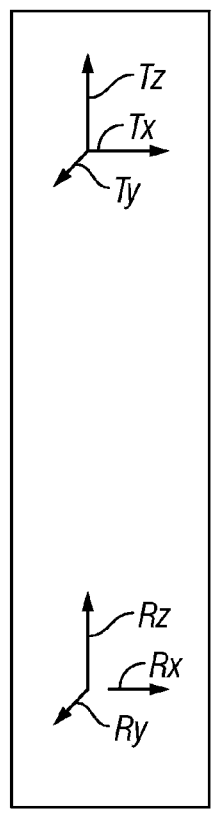
FIG. 5 shows the ability of the present invention to make multicomponent measurements over the same transmitter-receiver distances.
Figure 6:
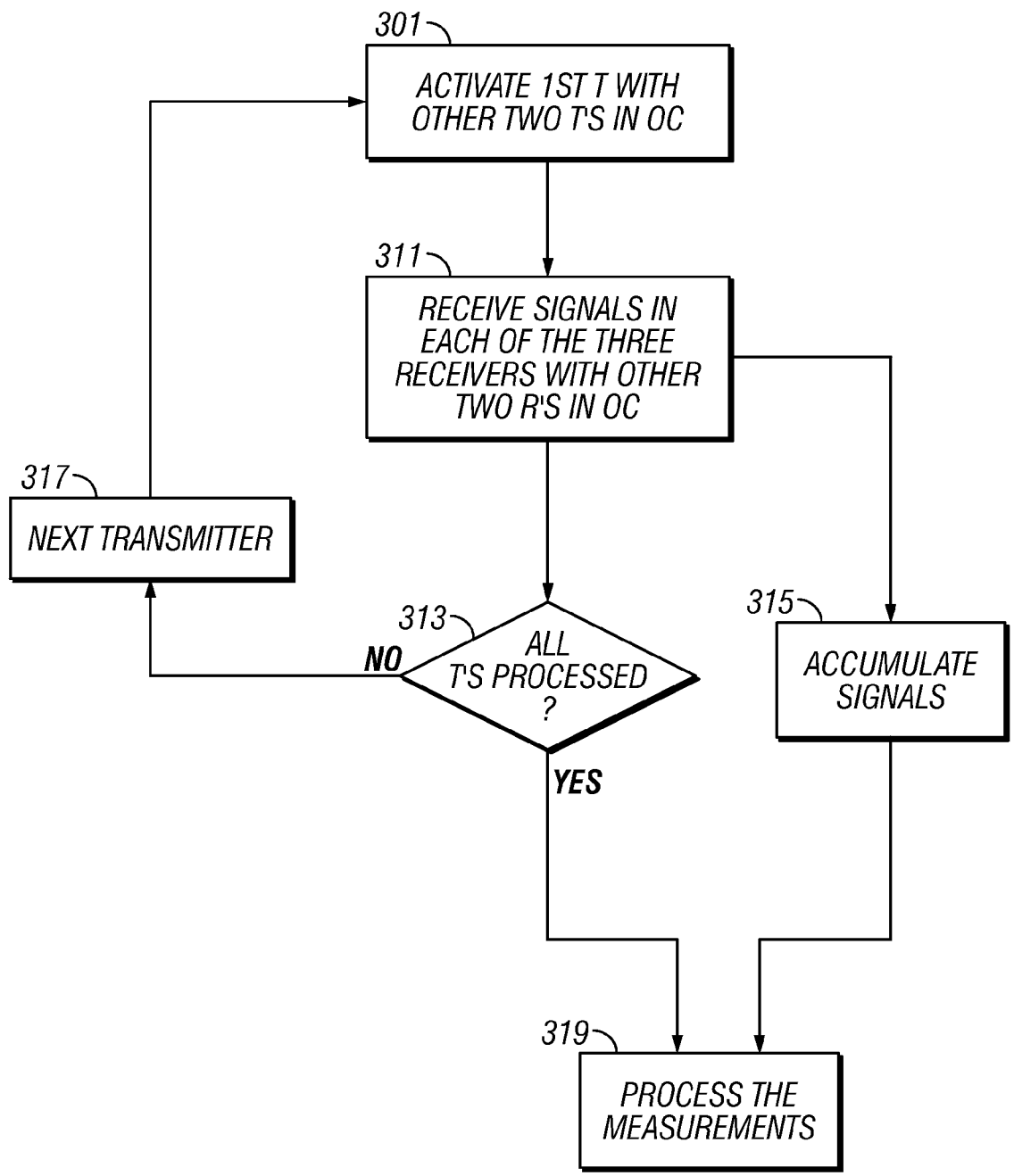
FIG. 6 is a flow chart illustrating a manner in which the apparatus of the present invention may be used.

The arrangement of coils of the receivers may be similar to the arrangement of the coils of the transmitter. When this is done, the coil arrangement may be schematically represented by FIG. 5. A comparison of FIG. 5 with FIG. 2 shows that with the arrangement of FIG. 5, all nine of the field components Hxx, Hxy, Hxz, Hyx, Hyy, Hyz, Hzx, Hzy and Hzz can be measured at the same transmitter receiver distance sampling substantially the same depth interval Typical operation of the logging tool is given in the flow chart of FIG. 6. The first transmitter coil is activated 301 with the other transmitter coils in open circuit. Signals are received in each of the receiver coils 311 (while keeping the non-receiving coil in open circuit). If the first transmitter is, for example, the x-transmitter, then this would give $H_{xx}$, $H_{yy}$ and $H_{xz}$ signals which are accumulated 315. A check is made to see if all the receiver signals were acquired 313. If yes, the next transmitter is activated 317. If all the transmitters have been activated, the accumulated signals are processed 319. It is to be noted that this is a continuous process as the logging tool is being conveyed through the borehole. It should also be noted that the shielding of the receivers is less important for the tool performance compared to the shielding of the transmitters and the former may be optional. The subsequent processing 319 may used prior art techniques to determine the the properties of interest of the earth formation. These could include (i) determination of horizontal and vertical resistivity of the earth formation, (ii) determination of the inclination of the borehole to the anisotropy axis, (iii) distance to a bed boundary in the earth formation. See, for example, U.S. Pat. No. 6,493,632 to Mollison et al., U.S. Pat. No. 6,618,676 to Kriegshauser et al., U.S. Pat. No. 6,885,947 to Xiao et al., and U.S. Pat. No. 6,900,640 to Fanini et al., U.S. Pat. No. 6,636,045 to Tabarovsky et al., all having the same assignee as the present application and the contents of which are incorporated herein by reference. It should further be noted that using the principles of reciprocity, the operations in FIG. 6 could be performed with the transmitter and receiver interchanged in the different steps. The determined properties may be output to a suitable medium and may be further used for operations like well completion and reservoir development.

The operation of the transmitter and receivers may be controlled by one or more processors. For wireline applications, the downhole processor and/or the surface processor may be used. Part of the processing may be done at a remote location away from the wellbore. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the preferred embodiments of the invention, various modifications will be apparent to those skilled in the art. It is intended that all variations within the scope of the appended claims be embraced by the foregoing disclosure.

What is claimed is:

1. An apparatus configured to evaluate an earth formation, the apparatus comprising:
    a first induction antenna;
    a second induction antenna having coil turns substantially orthogonal to a coil turn of the first induction antenna and surrounding the first antenna, and circuitry configured to switch the second antenna between (A) an open circuit mode in which an electric field produced by the first antenna is decoupled from a receiver antenna, and (B) an active mode;
    wherein a pitch of at least one of (i) the first induction antenna, and (ii) the second induction antenna is selected to reduce an attenuation of a magnetic field produced by the other of the first induction antenna and the second induction antenna.

2. The apparatus of claim 1 wherein the first and second induction antennas comprise transmitter antennas, the apparatus further comprising third and fourth induction antennas that comprise receiver antennas.

3. The apparatus of claim 1 further comprising a third induction antenna having coil turns substantially orthogonal to a coil turn of the first induction antenna and the second induction antenna.

4. The apparatus of claim 1 wherein the first induction antenna is in an active mode, the second induction antenna is in an open circuit mode, the apparatus further comprising:
    (i) a receiver induction antenna configured to produce a signal indicative of a property of the earth formation, the signal resulting from activation of the first induction antenna; and
    (ii) a processor configured to determine a value of the property of the earth formation using the signal.

5. The apparatus of claim 1 wherein the first induction antenna and the second induction antenna are disposed on a logging tool, the apparatus further comprising a conveyance device configured to convey the logging tool into a borehole, the conveyance device selected from (i) a wireline, (ii) a drilling tubular, and (iii) a slickline.

6. The apparatus of claim 1 wherein:
the first induction antenna is configured to operate at a first frequency;
the second induction antenna surrounds the first antenna and is configured to operate at a second frequency different from the first frequency; and
the receiver antenna is configured to produce an output indicative of a property of the earth formation upon activation of at least one of the induction antennas.

7. The apparatus of claim 6 wherein the first induction antenna and the second antenna are coupled to a current source having a high output impedance.

8. The apparatus of claim 6 wherein the receiver antenna is coupled to an amplifier having a high input impedance.

9. A method of evaluating an earth formation, the method comprising:
activating a first induction antenna in a borehole while using a second induction antenna surrounding the first induction antenna for electrically isolating an electric field resulting from activation of the first induction antenna;
using a receiver antenna for producing a signal indicative of a property of the earth formation, the signal resulting from the activation; and
estimating from the signal a value of the property of the earth formation;
wherein a pitch of at least one of (i) the first induction antenna, and (ii) the second induction antenna is selected to reduce an attenuation of a magnetic field produced by the other of the first induction antenna and the second induction antenna.

10. The method of claim 9 further comprising:
(i) subsequent to activating the first induction antenna, open circuiting the first induction antenna;
(ii) activating the second induction antenna; and
(iii) producing an additional signal indicative of the property of the earth formation from the activation of the second antenna;
wherein the estimating is further based at least in part on the additional signal.

11. The method of claim 9 further comprising using a third induction antenna to further isolate the electric field.

12. The method of claim 9 wherein the property of the earth formation is selected (i) a horizontal resistivity, (ii) a vertical resistivity of the earth formation, (iii) an inclination angle, and (iv) a distance to a bed boundary in the earth formation.

13. The method of claim 9 further comprising disposing the first induction antenna and the second induction antenna on a logging tool and conveying the logging tool into the borehole on one of (i) a wireline, (ii) a drilling tubular, and (iii) a slickline.

14. The method of claim 9 further comprising:
activating, at a first frequency, the first induction antenna;
closing the second antenna and activating, at a second frequency, the second induction antenna; and
using the receiver antenna to produce an output indicative of the property of the earth formation.

15. An apparatus configured to evaluate an earth formation, the apparatus comprising:
a first induction antenna;
a second induction antenna having coil turns substantially orthogonal to a coil turn of the first induction antenna and surrounding the first antenna, and circuitry configured to switch the second antenna between (A) an open circuit mode in which an electric field produced by the first antenna is decoupled from a receiver antenna, and (B) an active mode;
wherein a thickness of at least one of (i) a coil of the first induction antenna, and (ii) a coil of the second induction antenna is less than a skin depth of an electromagnetic wave at an operating frequency of the other of the first induction antenna and the second induction antenna.

16. The apparatus of claim 15 wherein the first induction antenna is in an active mode, the second induction antenna is in an open circuit mode, the apparatus further comprising:
(i) a receiver induction antenna configured to produce a signal indicative of a property of the earth formation, the signal resulting from activation of the first induction antenna; and
(ii) a processor configured to determine a value of the property of the earth formation using the signal.

17. The apparatus of claim 15 wherein the first induction antenna and the second induction antenna are disposed on a logging tool, the apparatus further comprising a conveyance device configured to convey the logging tool into a borehole, the conveyance device selected from (i) a wireline, (ii) a drilling tubular, and (iii) a slickline.

18. A method of evaluating an earth formation, the method comprising:
activating a first induction antenna in a borehole while using a second induction antenna surrounding the first induction antenna for electrically isolating an electric field resulting from activation of the first induction antenna;
using a receiver antenna for producing a signal indicative of a property of the earth formation, the signal resulting from the activation; and
estimating from the signal a value of the property of the earth formation;
wherein a thickness of at least one of (i) a coil of the first induction antenna, and (ii) a coil of the second induction antenna is less than a skin depth of an electromagnetic wave at an operating frequency of the other of the first induction antenna and the second induction antenna.

19. The method of claim 18 further comprising:
(i) subsequent to activating the first induction antenna, open circuiting the first induction antenna;
(ii) activating the second induction antenna; and
(iii) producing an additional signal indicative of the property of the earth formation from the activation of the second antenna;
wherein the estimating is further based at least in part on the additional signal.

20. The method of claim 18 wherein the property of the earth formation is selected (i) a horizontal resistivity, (ii) a vertical resistivity of the earth formation, (iii) an inclination angle, and (iv) a distance to a bed boundary in the earth formation.

* * * * *